United States Patent
Gupta

(10) Patent No.: US 10,255,676 B2
(45) Date of Patent: Apr. 9, 2019

(54) METHODS AND SYSTEMS FOR SIMULATING THE EFFECTS OF VISION DEFECTS

(71) Applicant: Amitabha Gupta, Toronto (CA)

(72) Inventor: Amitabha Gupta, Toronto (CA)

(73) Assignee: Amitabha Gupta, Toronto, Ontario (CA)

( * ) Notice: Subject to any disclaimer, the term of this patent is extended or adjusted under 35 U.S.C. 154(b) by 56 days.

(21) Appl. No.: 15/389,709

(22) Filed: Dec. 23, 2016

(65) Prior Publication Data

US 2018/0182093 A1    Jun. 28, 2018

(51) Int. Cl.
| | |
|---|---|
| *G06T 7/00* | (2017.01) |
| *G06T 3/00* | (2006.01) |
| *G06T 19/20* | (2011.01) |
| *H04N 13/00* | (2018.01) |

(52) U.S. Cl.
CPC .......... *G06T 7/0012* (2013.01); *G06T 3/0093* (2013.01); *G06T 19/20* (2013.01); *H04N 13/00* (2013.01); *G06T 2207/30041* (2013.01)

(58) Field of Classification Search
CPC .......... G06T 7/593; G06T 2207/10012; G06K 2009/363; G06K 9/40; H04N 13/00
See application file for complete search history.

(56) References Cited

U.S. PATENT DOCUMENTS

| | | | |
|---|---|---|---|
| 5,892,570 A | 4/1999 | Stevens | |
| 7,232,219 B2 | 6/2007 | Aguilar et al. | |
| 8,708,495 B2 | 4/2014 | Kohn et al. | |
| 2004/0156554 A1 | 8/2004 | McIntyre | |
| 2007/0146631 A1 | 6/2007 | Sinclair et al. | |
| 2011/0050864 A1* | 3/2011 | Bond | H04N 13/026 348/51 |
| 2011/0228219 A1 | 9/2011 | Lee et al. | |
| 2011/0254918 A1* | 10/2011 | Chou | H04N 13/0007 348/43 |
| 2013/0050187 A1* | 2/2013 | Korcsok | H04N 13/0011 345/419 |
| 2013/0107019 A1* | 5/2013 | Ooshima | H04N 5/238 348/49 |
| 2013/0250431 A1* | 9/2013 | Robbins | G02B 27/0172 359/633 |
| 2016/0270656 A1* | 9/2016 | Samec | A61B 3/085 |
| 2016/0353079 A1* | 12/2016 | Sawada | H04N 13/0033 |

FOREIGN PATENT DOCUMENTS

| | | |
|---|---|---|
| EP | 2930638 A1 | 10/2015 |
| WO | 2014100891 A1 | 7/2014 |

* cited by examiner

*Primary Examiner* — Uptal D Shah
(74) *Attorney, Agent, or Firm* — Rowand LLP

(57) ABSTRACT

A method for providing a simulation of a vision defect is disclosed. The method includes: receiving a first image of a scene and a second image of the scene, the first image corresponding to a first viewpoint of the scene and the second image corresponding to a second viewpoint of the scene; applying one or more first distortions to only a selected one of the first and second images; generating a stereoscopic image by merging the distorted one of the first and second images and an undistorted one of the first and second images; and displaying the stereoscopic image on a display.

15 Claims, 4 Drawing Sheets

A can contribute to eye problems if the
ay from the macula (a part of the retin
damage of the macula due to pulling o
vn proteins in the eye responsible for \
aration between the vitreous and mac
: alternative treatment for this conditi
roval represents a significant advance
d Edward Cox, M.D., M.P.H., director of
g Evaluation and Research. "Those wi

FIG. 3A

A can contribute to eye problems if th
ay from the macula (a part of the retin
damage of the macula due to pulling o
vn proteins in the eye responsible for \
aration between the vitreous and mac
: alternative treatment for this conditi
roval represents a significant advance
d Edward Cox, M.D., M.P.H., director of
g Evaluation and Research. "Those wi

METHODS AND SYSTEMS FOR SIMULATING THE EFFECTS OF VISION DEFECTS

TECHNICAL FIELD

The present disclosure relates to ophthalmology and, in particular, to methods and systems for providing simulations of the visual effects of vision defects.

BACKGROUND

Visual impairment can have significant consequences on a person's livelihood. The ability to perform ordinary, everyday functions can be disrupted by even relatively minor vision disorders. Vision problems can materialize in various forms, such as diminished visual acuity, distorted central or peripheral vision, eccentric fixation, and impaired depth perception. These problems may be caused by a wide range of medical conditions including macular degeneration, retinal detachment, and neurological deficits.

Vision tests can be performed as part of eye examinations or routine screenings to diagnose vision problems. Common vision tests, such as visual acuity, refraction and visual field tests, can facilitate detection of possible vision defects. Vision tests are also useful for monitoring the long-term progression of eye diseases in patients.

While accurate diagnosis of vision problems is important, effective treatment often demands more than just a formulaic prescription of corrective lenses or recommendations for surgery. Various considerations involving eye health, refractive status, and personal lifestyle can determine the appropriate course of treatment for a particular patient. Gaining an appreciation of the visual effects of vision defects experienced by a person can provide contextualized knowledge of her symptoms and help inform the choice of treatment techniques.

One of the challenges of simulating the perceived effects of vision defects is an inherent disconnect between the creator of the simulation and the experience of the patient. As may be expected, simulated visual effects rely to a large extent on testimonials of patients. Unfortunately, people with vision defects are often unable to accurately describe what they see, especially in cases involving complex distortions. As a consequence, they may be left to merely confirming or denying the accuracy of a particular simulation, rather than contributing relevant details for the actual generation of the simulation. Moreover, simulations that are based on generalized understandings of vision defects may fail to appropriately represent individualized visual reactions to real-life situations and contexts.

BRIEF DESCRIPTION OF DRAWINGS

Reference will now be made, by way of example, to the accompanying drawings which show example embodiments of the present application and in which:

FIGS. 3A to 3C show a sequence of transformations applied to an image of a scene in generating a simulation of a vision defect.

FIG. 3D shows an example of a stereoscopic image output showing visual effects of a vision defect.

Like reference numerals are used in the drawings to denote like elements and features.

DETAILED DESCRIPTION OF EXAMPLE EMBODIMENTS

Figure 1:
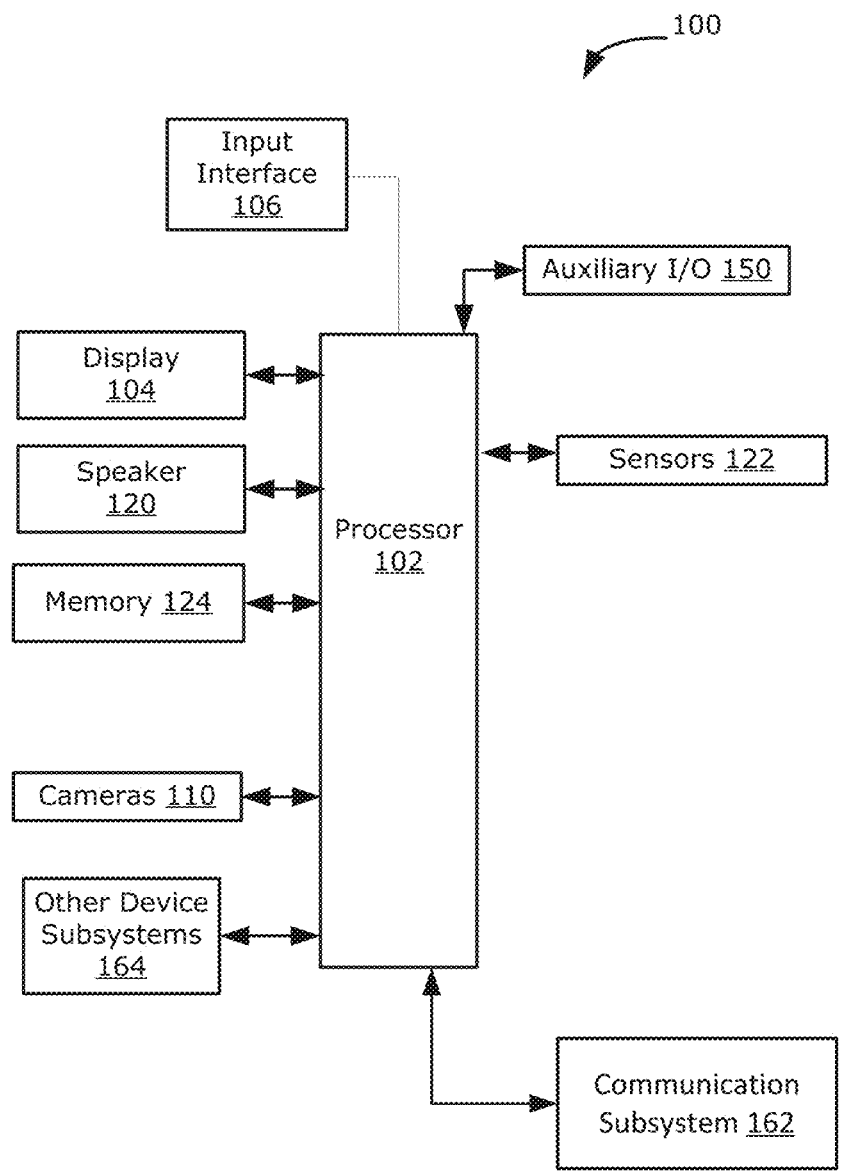
FIG. 1 is a block diagram of an example electronic device in accordance with example embodiments of the present disclosure.

In an aspect, the present disclosure describes a processor-implemented method for providing a simulation of a vision defect. The method includes: receiving a first image of a scene and a second image of the scene, the first image corresponding to a first viewpoint of the scene and the second image corresponding to a second viewpoint of the scene; applying one or more first distortions to only a selected one of the first and second images; generating a stereoscopic image by merging the distorted one of the first and second images and an undistorted one of the first and second images; and displaying the stereoscopic image on a display.

In another aspect, the present disclosure describes an electronic device for simulating visual effects of a vision defect. The electronic device includes a near-eye display and a processor coupled to the near-eye display. The processor being configured to: receive a first image of a scene and a second image of the scene, the first image corresponding to a first viewpoint of the scene and the second image corresponding to a second viewpoint of the scene; apply one or more first distortions to only a selected one of the first and second images; generate a stereoscopic image by merging the distorted one of the first and second images and an undistorted one of the first and second images; and display the stereoscopic image on the near-eye display.

In yet another aspect, the present disclosure describes a non-transitory computer-readable medium containing processor-executable instructions for providing a simulation of a vision defect. When executed, the instructions cause a processor to: receive a first image of a scene and a second image of the scene, the first image corresponding to a first viewpoint of the scene and the second image corresponding to a second viewpoint of the scene; apply one or more first distortions to only a selected one of the first and second images; generate a stereoscopic image by merging the distorted one of the first and second images and an undistorted one of the first and second images; and display the stereoscopic image on a display.

Other example embodiments of the present disclosure will be apparent to those of ordinary skill in the art from a review of the following detailed descriptions in conjunction with the drawings.

Simulation of vision problems can serve a number of important functions. For families and friends of those living with vision disorders, simulations can help to fulfill an educational role, by providing opportunities to learn about and experience first-hand some of the challenges faced by people with vision disorders. Such educational experiences can, in turn, lead to increased empathy with and more effective assistance for people that have vision defects. Accurate simulations may also allow healthcare professionals, such as ophthalmologists, to gain better understanding of a patient's symptoms and to discover and promote appropriate solutions for living with various types of vision problems. Simulations of vision defects can also be employed in medical and social research. For example, researchers may consider simulation data when inquiring into the effect of vision problems on children's learning processes or the psychosocial impact of visual impairments.

The visual effects of vision defects have traditionally been demonstrated by depicting distortions corresponding to the visual effects in a static image of a scene. For example, the effects of a scotoma may be demonstrated by showing distortions (e.g. blurring, flickering, etc.) of shapes in a static image or by superimposing various patterns and areas of reduced visual acuity (e.g. blind spots) on the image. Such static distortions have the effect of warping images so that the altered images are closer to what a person experiencing an acuity deficiency would see, compared to what would be seen by someone with normal vision. While this type of simulation may be useful for purposes of recognizing obvious symptoms of vision disorders, in some cases, it is be desirable to go beyond the traditional constraints of static, 2-dimensional representations of vision defects.

Reference is first made to FIG. 1, which shows a block diagram of an example electronic device 100 in accordance with example embodiments of the present disclosure. In at least some embodiments, the electronic device 100 is a head-mounted display (HMD). An HMD is a display device that can be worn directly by a user or as part of other headgear. HMDs can display computer-generated virtual images, live real-world views, or combinations of both (e.g. virtual images superimposed on a view of a real-world environment). For example, the electronic device 100 may take the form of smart glasses having a transparent heads-up display with augmented reality (AR) overlay, or a virtual reality (VR) headset for displaying an immersive VR environment. The surge of interest in virtual and augmented reality applications in recent years have led to an increase in the demand for and technical capabilities of modern HMDs. HMDs are now widely used to provide training and visualization in, among others, military, engineering, medical and recreational contexts.

The electronic device 100 includes a housing which contains the components of the electronic device 100. The internal components of the electronic device 100 are encased in the housing. The housing may be adapted to be directly wearable by a user or as an add-on to headgear such as a helmet or visor. The electronic device 100 includes a controller, including at least one processor 102, such as a microprocessor, which controls the operation of the electronic device 100. The processor 102 may be a single processor with multiple cores or multiple processors (with single or multiple cores). It will be appreciated that, in at least some embodiments, the controller may, instead of or in addition to the processor 102, include an analog circuit or other types of circuits capable of performing a part or all of the functions of the processor 102 that are described herein. The processor 102 may be communicably coupled with a plurality of device subsystems including a graphics processing unit (GPU), one or more output interfaces (such as a display unit 104 and/or a speaker 120), one or more input interfaces 106 (such as a first camera, a second camera, a sensor module 122), memory 124 (such as a flash memory or read-only memory (ROM)), auxiliary input/output (I/O) subsystems 150, a communication subsystem 162 and other device subsystems generally designated as 164. Some of the subsystems shown in FIG. 1 perform communication-related functions, whereas other subsystems may provide "resident" or on-device functions.

The display unit 104 comprises a near-eye display for displaying visual information. Visual information may include content such as images, live video, application pages and graphical user interfaces (GUI). The display unit 104 may include a single display screen (monocular) or a separate display screen for each eye (binocular), lenses and/or semi-transparent mirrors embedded in the housing. The display unit 104 is positioned in the field of vision of the user wearing the electronic device 100 and may display visual information in several different ways. In some embodiments, the display unit 104 may be fully opaque such that a user's external environment is not visible and only computer-generated images are displayed on the display unit 104. In some other embodiments, real- and virtual-world views may be combined by using semi-transparent mirrors that reflect computer-generated images directly into a user's eyes, or by electronically combining video representations of the real-world environment with computer-generated images (i.e. optical head-mounted displays (OHMDs)). For example, if the electronic device 100 is an OHMD, the electronic device 100 may allow a user to see a real-world view of her surroundings overlaid with streaming data and virtual images received and/or generated by the electronic device 100.

The display unit 104 may output information based on a control command from the processor 102 or data received directly from one or more external sources (e.g. desktop computers, mobile devices, wireless networks, etc.). The communication subsystem 162 may include a wireless communication module for connecting to wireless networks such as a Wireless Wide Area Network (WWAN) and/or a Wireless Local Area Network (WLAN) and/or other suitable network arrangements. The communication subsystem 162 may also include a short-range communication module, which implements short-range radio technologies such as Bluetooth®. The electronic device 100 may connect via a wired or wireless connection to external devices in order to transmit and receive data. Such data from external sources may be processed by the processor 102 and combined with data generated by the electronic device 100 to obtain displayable content.

In some embodiments, the electronic device 100 includes one or more cameras 110. The cameras 110 may be detachably mounted to or integrally formed with the housing. For example, the electronic device may include one or more cameras embedded at different positions within the housing. The cameras 110 may be communicably coupled to the processor 102. The cameras 110 are capable of capturing camera data, such as images in the form of still photographs and/or motion video. In particular, camera data may be captured in the form of electronic signals produced by image sensors associated with the cameras 110 and transmitted to the processor 102 or a storage medium, such as memory 124. In at least some embodiments, the processor 102 may process the image and/or video signal output from the cameras 110 and generate data for display by the display unit 104 based on the processed signal output.

A pair of cameras 110 may collectively be capable of capturing stereoscopic images for display. That is, a selected pair of the cameras 110 may collectively produce stereoscopic image data which defines a stereoscopic image. Stereoscopic images can provide an illusion of depth in the images to a user (i.e. three-dimensional images). To produce stereoscopic data, two of the cameras 110 are oriented in generally the same direction. More specifically, two cameras may be mounted on the housing such that they are directed toward a scene in front of a user when the electronic device 100 is worn by the user. In particular, these front-facing cameras may be arranged to capture images of a scene as seen by the user's eyes. In at least some embodiments, the cameras 110 may be mounted in laterally spaced relation to each other. For example, the distance between a pair of the cameras 110 may be approximately equal to an average value for the inter-pupillary distance of a person (e.g. around 63 millimeters).

The electronic device 100 may store data in a memory 124 which, in some embodiments, may be an erasable persistent memory such as a flash memory. The data may include service data including information used by the electronic device 100 to establish and maintain communication with external devices and/or wireless networks. The data may also include user information, application data, and other data generated or received by the electronic device 100. The data may be organized, at least partially, into one or more databases or data stores. The databases or data stores may contain data items of the same data type or associated with the same application(s). The memory 124 may also contain instructions for execution by the processor 102 for operating the electronic device 100.

In at least some embodiments, the electronic device 100 includes a sensor module 122. The sensor module 122 may comprise various sensors that can be integrated on-board the electronic device 100. The sensors of the sensor module 122 may include, among others, head motion tracking sensors (such as gyroscopes, accelerometers and magnetometers), infrared sensors, ambient light sensors, sound capture systems, and eye-tracking sensors. In particular, the sensor module may generate sensor data relating to a user's surrounding environment and the user's own movements while the electronic device 100 is worn and operated by the user. For example, upon detection that the electronic device 100 is worn by a user (e.g. via readings from a proximity sensor) or that the electronic device 100 is in active use, one or more sensors of the sensor module 122 may be configured to start generating sensor data.

Each sensor may be configured to transmit collected sensor data to the processor 102 and/or the memory 124, at predetermined times or upon receipt of instructions to transmit the collected data. Alternatively, sensor data from the sensors may be received continuously. It will be appreciated that, in some cases, a single sensor may serve the functionalities of two or more sensors. For example, a proximity sensor of the electronic device 100 may also operate as a light sensor capable of collecting measurements of ambient light intensities.

In some embodiments, the electronic device 100 may be connected with one or more peripheral devices and/or external systems. For example, the electronic device 100 may be configured to establish wireless (e.g. Bluetooth®) connections with user-operated input devices that can be used for, among others, interface scrolling and selecting, application data control and interaction with virtual environments. As a further example, the electronic device 100 may connect to one or more sensors that are used to track motion data in a confined space or region. Once the connections are established, the electronic device 100 may exchange data with these devices and/or systems in real-time.

The example embodiments of the present application will be described primarily in relation to an electronic device suitable for wearing by a user, such as an HMD. It will be appreciated by those skilled in the art, however, that this description is not intended to limit the scope of the described embodiments to HMDs. The methods and systems described herein may be applied to any appropriate electronic device(s), whether portable or not, including, without limitation, 3D televisions, desktop computers, laptops, tablets, and the like, that are capable of providing visual display of information.

Figure 2:
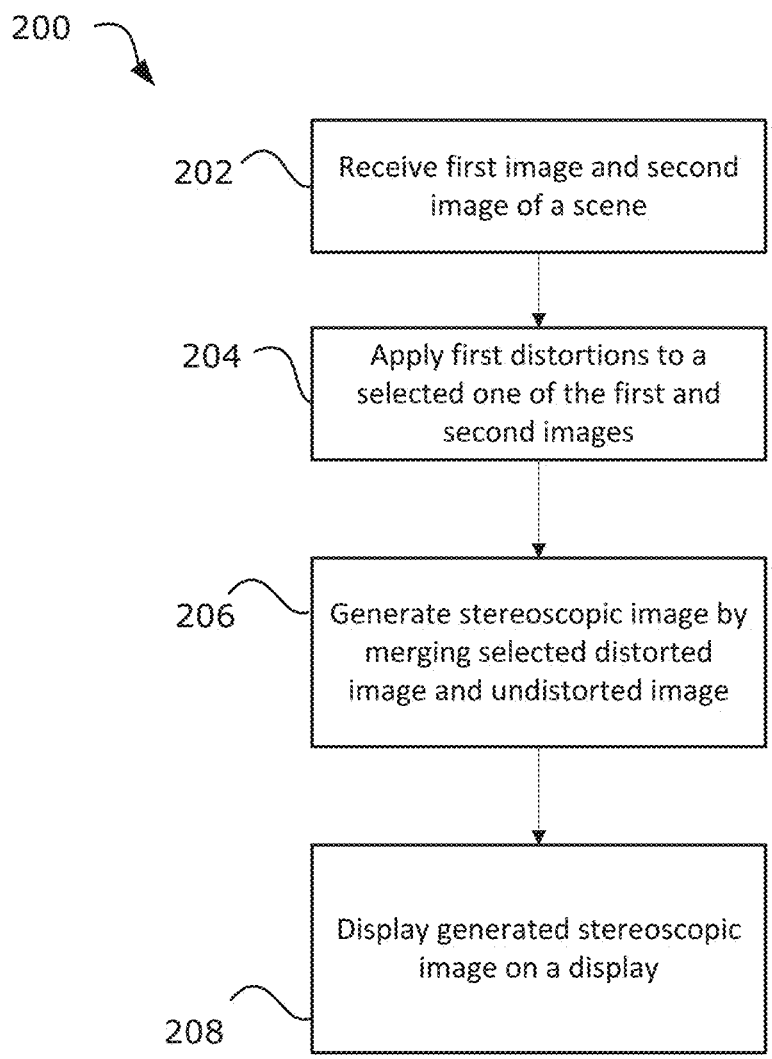
FIG. 2 shows a flowchart illustrating an example method of providing a simulation of vision defects in accordance with example embodiments of the present disclosure.

Reference is now made to FIG. 2, which shows, in flowchart form, an example method 200 for providing a simulation of a vision defect. One or more electronic devices may be configured to collaboratively perform the method 200. In at least some embodiments, the components of a single electronic device, such as electronic device 100 of FIG. 1, and more specifically an HMD, may be capable of performing the method 100. In particular, the method 200 may be performed by a processor, such as processor 102 of FIG. 1, an embedded microprocessor on a mobile device, or any other central processing unit (CPU) of a computer.

In operation 202, a first image of a scene and a second image of the scene are received. The first image corresponds to a first viewpoint of the scene while the second image corresponds to a second viewpoint of the scene. In at least some embodiments, the first image may correspond to a left eye image of a scene and the second image may correspond to a right eye image of the scene. For example, the first and second images may be received from a left eye camera and a right eye camera, respectively, associated with an HMD that is in active use and worn by a user. As a further example, the processor may receive encoded video data for a stereoscopic video and extract left-eye video frame data and right-eye video frame data from the encoded video data to obtain first and second images of a scene. The images may be received in real-time or transmitted from memory associated with the respective cameras. In some embodiments, the first and second images may be pre-processed images that are transmitted by an external source, such as a desktop computer, a mobile communications device, or an external memory/storage.

In some embodiments, at operation 202, only a single image, as opposed to two different images, may be received. For example, a single image corresponding to a certain viewpoint may serve as both the first image and the second image, in operation 202. That is, the first image and the second image may correspond to the same image.

In operation 204, one or more first distortions are applied to only a selected one of the first and second images. That is, the one or more first distortions are applied to either the first image or the second image, but not to both images. The choice of which image to apply the distortions to may be selected, for example, by a user of the HMD or an administrator of the visual defect simulation. Furthermore, a combination of two or more distortions may be applied to the selected image either concurrently or in series, which may facilitate simulation of compound effects of vision defects.

The one or more first distortions correspond to at least one visual effect associated with the vision defect. In some embodiments, one or a plurality of radial distortions may be applied to the selected image. A radial distortion (such as a barrel distortion, a pincushion distortion, or a mustache distortion), may simulate the natural blurring of peripheral vision. In some embodiments, various distortions corresponding to the visual effects of a central metamorphopsia may be applied to the selected image. For example, the distortions may be based on parameters that are customized according to data relating to a specific patient. That is, one or more parameters indicating at least one of magnitude and location of the first distortions may be received at the processor, and the first distortions may be applied to the selected image according to the received parameters. In particular, the distortions that are applied to the selected image may be controlled by varying the amount/degree or regions of distorted vision. The control of the distortions which are to be applied may be performed either by a user of the HMD, via one or more input interfaces associated with the HMD, or remotely on a computer system which is communicably coupled to the HMD.

Various known image warping or morphing techniques may be implemented in applying the one or more first distortions. In particular, various different techniques for altering pixel data for the selected image may be employed. For example, in at least some embodiments, image filters or distortion grids may be applied to the selected image.

In operation 206, a stereoscopic image is generated by merging the distorted one of the first and second images and the undistorted one of the first and second images. For example, a distorted first image corresponding to a left eye and an undistorted second image corresponding to a right eye may be assembled together as a stereoscopic pair. In some embodiments, the one or more distortions may be entirely applied to the selected image prior to the combination. Alternatively, a subset of the distortions may be applied to the selected image before the merging of the images and a subset may be applied after the merging.

In some cases, one or more second distortions may be applied to the undistorted image, and the stereoscopic image may be generated by merging both of the distorted first and second images. For example, if one or more first distortions are applied to the undistorted first image, the processor may apply one or more second distortions, which may be different from the first distortions, to the undistorted second image. The distorted images may then be merged to produce a stereoscopic image.

In at least some embodiments, sensor data from one or more sensors coupled to the processor may be used in conjunction with camera data in producing simulations of vision defects. The sensor data may inform when to trigger certain visual distortions during a live, real-time simulation and what types of distortions are appropriate to apply to images of a scene. For example, in real-life situations, ambient light may affect one eye more than it affects the other eye when a scene is being viewed by a person. More generally, a person's surrounding environment may create the conditions for triggering various vision impairments. The use of sensor data may facilitate incorporating environmental factors into the simulation of vision defects. In particular, the one or more distortions to apply to a selected image may be selected based on sensor data received from one or more sensors that are coupled to the processor. More specifically, the processor may receive sensor data from one or more sensors, such as ambient light sensors or orientation sensors, and based on an analysis of the sensor data, the appropriate distortions to apply to a selected image of a scene during simulation may be selected.

Finally, in operation 208, the generated stereoscopic image is displayed on a display, such as display unit 104. For example, the stereoscopic image may be displayed on a near-eye display that is mounted on the HMD worn by the user. In some embodiments, one or more further distortions may be applied to the generated stereoscopic image, and the distorted stereoscopic image may be displayed.

Figures 3C, 3D:
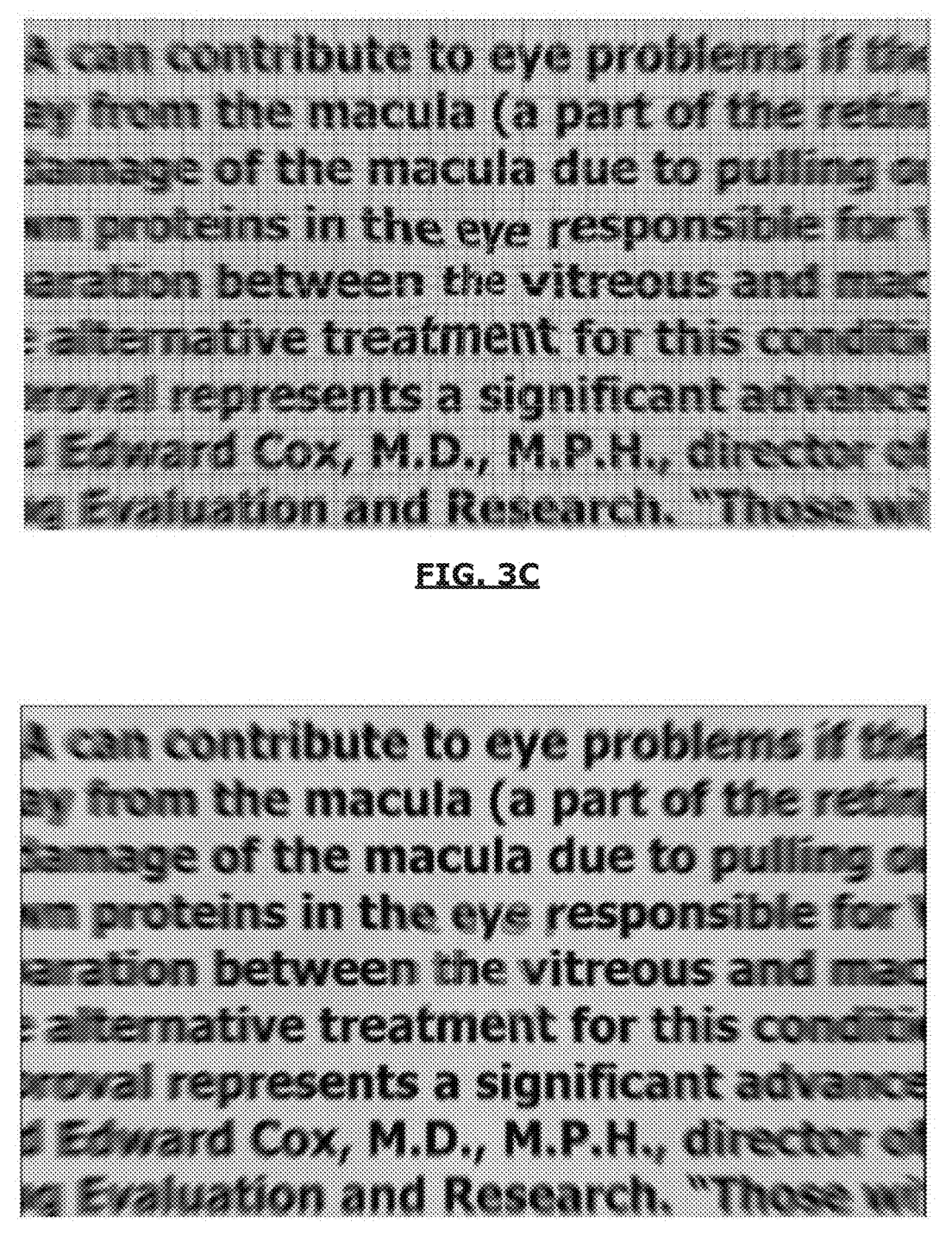

FIGS. 3A to 3C show an example sequence of transformations applied to an image of a scene in generating a simulation of a vision defect. FIG. 3A shows an undistorted left eye image. FIG. 3B shows the image after a radial distortion simulating eccentric blurring has been applied to the image, and FIG. 3C shows the image after a subsequent central distortion, corresponding to the effect of metamorphopsia, are applied to the image. The distorted left eye image and an undistorted right eye image of the initial image are assembled as a stereoscopic pair. FIG. 3D shows the merged stereoscopic image, shown as a red-blue anaglyph.

The simulation techniques disclosed herein may be implemented as part of various display technologies and applications. In some embodiments, video input data, such as those used in gaming and virtual reality environments, may be modified to provide simulation of one or more visual effects of a vision defect. For example, video data for a driving game or a virtual reality driving simulation may be altered to include distortions that simulate the effects of a vision defect for only one or both eyes of a user. The simulation may be augmented by the use of one or more sensors which may provide useful information about a surrounding environment of an individual experiencing a simulation in real-time. In particular, a user's interaction with her surrounding environment (e.g. head movement, etc.) may affect the simulated visual effects which are presented to the user in virtual reality. As another example, original 3-D videos can be modified off-line and selected changes, such as image warps or distortions, may be applied to one or both of left and right eye images, and reassembled into a 3-D video for viewing in simulation. Streaming videos for viewing using 3-D TV's or virtual reality glasses may be modified while being streamed to a suitable display. Image data for streaming videos may be divided into two sets of data, one for the left eye and one for the right eye, and distortions may be separately applied to the respective sets of data prior to being combined into a stereoscopic pair and displayed to a user in 3-D video or in virtual reality. Similarly, separate distortions may be applied to 2-D videos corresponding to left and right eye views, in simulating difficulties associated with viewing TV's or ordinary movies.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A processor-implemented method for providing a simulation of a vision defect, comprising:
   receiving a first image of a scene and a second image of the scene, the first image corresponding to a first viewpoint of the scene and the second image corresponding to a second viewpoint of the scene, wherein the first image is received from a first camera and the second image is received from a second camera, the first camera and the second camera being mounted on a device worn by a user and being directed at the scene;
   receiving parameters indicating at least one of magnitude and location of one or more first distortions to apply to one of the first and second images, the one or more first distortions simulating at least one visual effect associated with the vision defect and the parameters being customized according to patient-specific vision defect data;

applying the one or more first distortions to only a selected one of the first and second images, the one or more first distortions being controlled according to the received parameters;

generating a stereoscopic image by merging the distorted one of the first and second images and an undistorted one of the first and second images; and displaying the stereoscopic image on a near-eye display mounted on the device worn by the user.

2. The method of claim 1, wherein the one or more first distortions comprise a radial distortion.

3. The method of claim 1, wherein applying the one or more first distortions to the first image comprises altering pixel data for the selected one of the first and second images according to a distortion grid.

4. The method of claim 1, further comprising:

applying one or more further distortions to the generated stereoscopic image, wherein displaying the stereoscopic image on the display comprises displaying the distorted stereoscopic image.

5. The method of claim 1, further comprising applying one or more second distortions to the undistorted one of the first and second images, wherein the stereoscopic image is generated by merging both of the distorted first and second images.

6. The method of claim 5, wherein the one or more first distortions are different from the one or more second distortions.

7. The method of claim 1, wherein receiving the first image and the second image comprises:

receiving encoded video data for a stereoscopic video; and extracting left-eye video frame data and right-eye video frame data from the encoded video data, wherein the first image is obtained from the left-eye video frame data and the second image is obtained from the right-eye video frame data.

8. An electronic device for simulating visual effects of a vision defect, comprising:

a near-eye display mounted on a device worn by a user; and a processor coupled to the near-eye display, the processor being configured to:

receive a first image of a scene and a second image of the scene, the first image corresponding to a first viewpoint of the scene and the second image corresponding to a second viewpoint of the scene, wherein the first image is received from a first camera and the second image is received from a second camera, the first camera and the second camera being mounted on the device worn by the user and being directed at the scene;

receive parameters indicating at least one of magnitude and location of one or more first distortions to apply to one of the first and second images, the one or more first distortions simulating at least one visual effect associated with the vision defect and the parameters being customized according to patient-specific vision defect data;

apply the one or more first distortions to only a selected one of the first and second images, the one or more first distortions being controlled according to the received parameters;

generate a stereoscopic image by merging the distorted one of the first and second images and an undistorted one of the first and second images; and display the stereoscopic image on the near-eye display.

9. The device of claim 8, wherein the one or more first distortions comprise a radial distortion.

10. The device of claim 8, wherein applying the one or more first distortions to the first image comprises altering pixel data for the selected one of the first and second images according to a distortion grid.

11. The device of claim 8, wherein the processor is further configured to:

receive encoded video data for a stereoscopic video; and extract left-eye video frame data and right-eye video frame data from the encoded video data, wherein the first image is obtained from the left-eye video frame data and the second image is obtained from the right-eye video frame data.

12. The device of claim 8, further comprising one or more sensors coupled to the processor, wherein the processor is further configured to: receive sensor data from the one or more sensors; and select the one or more first distortions to apply to the selected one of the first and second images based on the received sensor data.

13. The device of claim 12, wherein the one or more sensors comprise an ambient light sensor.

14. The device of claim 12, wherein the one or more sensors comprise an orientation sensor.

15. A non-transitory computer-readable medium containing processor-executable instructions for providing a simulation of a vision defect, wherein the instructions, when executed, cause a processor to:

receive a first image of a scene and a second image of the scene, the first image corresponding to a first viewpoint of the scene and the second image corresponding to a second viewpoint of the scene, wherein the first image is received from a first camera and the second image is received from a second camera, the first camera and the second camera being mounted on a device worn by a user and being directed at the scene;

receive parameters indicating at least one of magnitude and location of one or more first distortions to apply to one of the first and second images, the one or more first distortions simulating at least one visual effect associated with the vision defect and the parameters being customized according to patient-specific vision defect data;

apply the one or more first distortions to only a selected one of the first and second images, the one or more first distortions being controlled according to the received parameters;

generate a stereoscopic image by merging the distorted one of the first and second images and an undistorted one of the first and second images; and display the stereoscopic image on a near-eye display mounted on the device worn by the user.

* * * * *